April 14, 1925.
F. W. SPERR, JR., ET AL
GAS PURIFICATION PROCESS
Original Filed Dec. 8, 1921
1,533,773
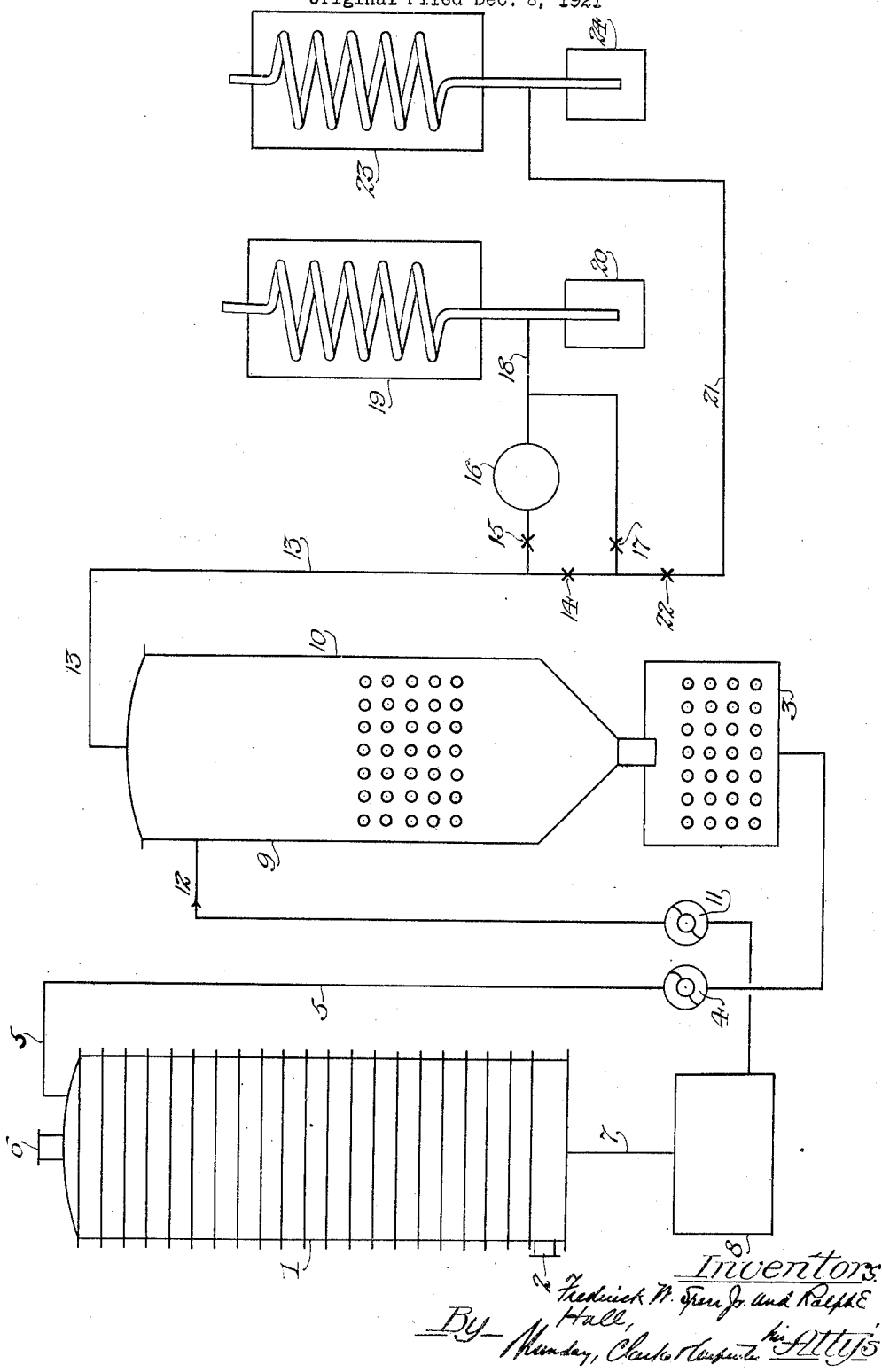

Patented Apr. 14, 1925.

1,533,773

UNITED STATES PATENT OFFICE.

FREDERICK W. SPERR, JR., AND RALPH E. HALL, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

GAS-PURIFICATION PROCESS.

Application filed December 8, 1921, Serial No. 520,805. Renewed June 5, 1924.

*To all whom it may concern:*

Be it known that we, FREDERICK W. SPERR, Jr., and RALPH E. HALL, citizens of the United States, residing in Pittsburgh, in the county of Allegheny and State of Pennsylvania, have invented a new and useful Improvement in Gas-Purification Processes, of which the following is a specification.

This invention relates to the removal of hydrogen sulphide and other impurities such as carbon dioxide and hydrocyanic acid from gases containing them. The invention has particular reference to a liquid process for gas purification, employing an alkaline absorbent agent, such as solutions of the carbonates of the alkali metals, for effecting the removal of hydrogen sulphide from the gas, with recovery of such hydrogen sulphide in a sufficiently concentrated form so that it can be adapted to a variety of commercial purposes, such as the manufacture of sulphuric acid. Other solutions of alkaline reaction, such as the hydroxides of the alkali metals, may also be employed, but the essential reactions involved are practically the same. The process of the invention is especially applicable to the treatment of coke oven gas and other gases containing carbon dioxide as well as hydrogen sulphide, in that any carbon dioxide absorbed from the gas is employed in a regeneration stage as a factor contributing to the removal and recovery of the absorbed hydrogen sulphide from the solutions formed in the process. Should there be a deficiency of carbon dioxide in the gas being treated, it may be desirable to add carbon dioxide, from an extraneous source, either to the gas or to the solution before or while the latter is being heated. Moreover, any hydrocyanic acid present in the gas is, for the most part, removed by the process.

A particular characteristic of the process of the invention is that it operates efficiently, notwithstanding variation in the amounts and relative proportions of carbon dioxide and hydrogen sulphide in industrial gases, such as coke oven gas, producer gas, water gas and the like. While such variation causes a corresponding variation in the composition of the solution after it has come in contact with the gas, the invention provides a proper regeneration of the solution containing such absorbed impurities, with great efficiency in recovery of the hydrogen sulphide. By the invention, the regeneration of the solution by heating is so controlled that the absorbed gases may be completely expelled irrespective of their amount and relative proportion. A separation of the hydrogen sulphide from an excess of carbon dioxide, is also accomplished with the result that the hydrogen sulphide may be recovered at a higher degree of concentration, with little dilution by carbon dioxide.

In addition to the general objects recited above, the invention has for further objects such other improvements or advantages in operation or results as may be found to obtain in the apparatus and processes hereinafter described or claimed.

In the accompanying drawing forming a part of this specification and showing for purposes of exemplification a preferred form and manner in which the invention may be embodied and practiced, but without limiting the claimed invention specifically to such illustrative instance.

The figure illustrates a diagrammatic representation of apparatus for carrying out the improved gas purification process of the present invention.

In its present embodiment, the invention is applied to the removal of hydrogen sulphide and carbon dioxide from fuel gas, such as coke oven gas. For convenience, the present description will be confined to this use of the invention. Features of the invention are, however, capable of other valuable applications, for example, the invention may be applied generally to the recovery of hydrogen sulphide from gases, and particularly to those gases which contain carbon dioxide in addition to the hydrogen sulphide. Consequently, the invention is not limited in its scope to the specific use and embodiment herein described as an illustrative example.

In the following description, particular reference will be made to the use of a sodium carbonate solution as the purifying agent, but with the understanding that other alkaline solutions may be advantageously employed. As stated in the copending application of Edward Victor Espenhahn, for Letters Patent of the United States, filed February 9, 1921, Serial No. 443,498, when gas, containing hydrogen sulphide, carbon dioxide and hydrocyanic acid is brought into contact with a sodium carbonate solution, the following reactions occur:

$$Na_2CO_3 + CO_2 + H_2O = 2NaHCO_3$$
$$Na_2CO_3 + H_2S = NaHCO_3 + NaHS$$
$$Na_2CO_3 + HCN = NaHCO_3 + NaCN$$

According to the invention, the gas to be purified is treated with the sodium carbonate solution for absorption of hydrogen sulphide, carbon dioxide and hydrocyanic acid, if any of the latter be present, and the resulting fouled solution is heated, first under vacuum or reduced pressure for the removal of the bulk of the hydrogen sulphide together with some of the carbon dioxide and next under a relatively higher pressure, preferably higher than atmospheric pressure, for the removal of the rest of the carbon dioxide. By the invention, there is employed the best condition for the decomposition of the sodium hydrosulphide formed according to the equation given above, i. e., by heating the fouled solution under vacuum; there is also employed the best condition for the decomposition of the sodium bicarbonate, i. e., by heating under a pressure higher than atmospheric. The decomposition of the sodium hydrosulphide is accelerated by the presence of sodium bicarbonate. This is exemplified by the following equation:

$$NaHS + NaHCO_3 = Na_2CO_3 + H_2S$$

It is, therefore, desirable to keep the maximum amount of bicarbonate in the solution while the sodium hydrosulphide is being decomposed. Consequently, the decomposition of the sodium hydrosulphide should be performed first. After the bulk of the sodium hydrosulphide is decomposed, by the heating under vacuum, and hydrogen sulphide has been expelled from the solution, the solution is heated under pressure, the heating being continued until the bicarbonate is decomposed to the required extent.

By conducting the initial heating of the solution under vacuum, a high degree of efficiency in expulsion of the hydrogen sulphide is attained. Should the proportion of carbon dioxide in the gas be such that the amount of carbon dioxide absorbed is but little more than that required to react with the sodium hydrosulphide according to the equation given above, the initial heating under vacuum will be found sufficient to expel this carbon dioxide and thus properly to regenerate the solution. If, on the other hand, there is a considerable excess of carbon dioxide in the gas, the absorbed carbon dioxide will not be expelled as rapidly as the hydrogen sulphide, and the complete expulsion of the carbon dioxide, remaining after the hydrogen sulphide is driven off, is not readily accomplished by continuing the heating under vacuum. However, if the solution be subjected to a further heating operation under pressure, the remainder of the carbon dioxide is very rapidly driven off.

A simple apparatus for carrying out the process of the invention is shown in the figure of the accompanying drawing. Referring to said drawing: The gas, containing carbon dioxide and hydrogen sulphide, enters the scrubber 1 through the pipe 2. The scrubber is preferably of the bell washer type. However, a mechanical scrubber may be employed, if desired. The absorbent agent, such as a sodium carbonate solution, is pumped from the tank 3 by the pump 4 through the line 5 and is discharged into the top of the scrubber. In the scrubber the solution passes in direct contact countercurrent with the gas. As hereinabove stated, the conditions of operation are such that the absorbent solution, as it enters the scrubber, will always contain some sodium bicarbonate; however, it is advisable, to keep the bicarbonate content as low as possible. In treating coke oven gas, for example, good practical results are obtained by employing a solution, the toal alkalinity of which is equivalent to from 15 to 20 per cent sodium carbonate. The content of sodium bicarbonate in such a solution as it enters the scrubber is preferably between 4 and 5.5 per cent. The temperature of the solution is preferably not over 40° C.; furthermore, it is desirable to cool the gas to this temperature or less before it enters the scrubber.

In the scrubber 1, the solution absorbs the bulk of the hydrogen sulphide from the gas together with a considerable proportion of its carbon dioxide content. From the absorption operation, the thus purified gas discharges through the outlet pipe 6 at the top of the scrubber. The fouled solution, i. e., the solution containing the absorbed impurities, discharges from the bottom of the scrubber through pipe 7 into a tank 8. The subsequent treatment of the fouled solution to expel the absorbed gases and restore it to the condition in which it entered the scrubber depends, from a practical standpoint, on the quantity to be handled, and may be either continuous or intermittent. The following description relates to intermittent treatment, but the invention, it will be understood, comprehends any method embodying the principle of heating at pressures suitable for the requisite expulsion of the hydrogen sulphide and carbon dioxide.

In the present instance, the heating is performed in the evaporator 9, which may be any commercial type of evaporator adapted to the use of either vacuum or pressure. The heating is effected by the steam coils 10;

however, direct heating may also be employed, and, if desired, the operation may be assisted by blowing steam directly into the contents of the evaporator. Sufficient liquid to fill the evaporator is transferred from tank 8 by pump 11 through line 12 which leads into the top of the evaporator. In the vapor outlet line 13, valve 14 is closed and valve 15 communicating with vacuum pump 16 is open. Valve 17, in the by-pass line around the vacuum pump, is closed. The contents of the evaporator are heated under a high vacuum, preferably about 25 inches mercury, until tests of the contents show that most of the hydrogen sulphide has been eliminated. The extent to which this elimination should be carried depends upon the degree of gas purification desired. If substantially complete removal of the hydrogen sulphide from the gas be desired, it is preferable to continue the heating under vacuum until substantially 90 per cent of the hydrogen sulphide is driven off. Some of the remaining hydrogen sulphide will also be expelled in the course of subsequent heating under pressure, if such subsequent heating is found necessary.

In the heating under vacuum described above, more or less carbon dioxide is also expelled, the amount expelled depending upon the amount absorbed by the solution in passing through the gas scrubber. In the case of gas containing relatively low percentages of carbon dioxide, the content of carbon dioxide in the solution is relatively small and it may be expelled to a sufficient extent by the initial vacuum heating with the result that no additional heating is necessary. As has been stated, it is desirable to keep a certain amount of bicarbonate in the solution, and it is preferable that the solution entering the scrubber (in the treatment of coke oven gas) contain between 4 and 5 5 per cent sodium bicarbonate. In any case, the sodium bicarbonate in the solution must always be in excess of the amount required to decompose all of the sodium hydrosulphide present, in accordance with the reaction

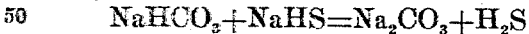

The treatment of the solution following the heating under vacuum will, therefore, depend upon the percentage of bicarbonate present when such heating is finished. It will often be found that the vacuum heating is sufficient to reduce the bicarbonate to the required amount. If, however, too much bicarbonate is still present, the excess is decomposed by heating under pressure. For this purpose, valve 15 is closed and valve 14 is partially opened, the opening being regulated so that pressure builds up in the evaporator to about 15 pounds. It has been found advisable, in practical operation, to complete the decomposition of the bicarbonate under approximately this pressure. The heating under pressure is continued until samples of the liquid in the evaporator show that the bicarbonate has been reduced to the required amount.

By the operation described above, the solution is regenerated so that it can be used to absorb the additional quantities of hydrogen sulphide and carbon dioxide from the gas. The hot solution is discharged from the evaporator into a cooling tank 3, provided with coils of pipe through which cooling water is circulated. In larger plants, it may be advisable to install heat exchange apparatus so that this hot solution may be used to preheat the cold liquor going into the evaporator. After the evaporator has been emptied, it is ready for a new charge from the tank 8.

The operations in the evaporator have the effect of concentrating the solution. The concentration may be between 15 and 25 per cent. It is, therefore, necessary to add water to restore the solution to the requisite percentage of total alkalinity, which as has been stated is preferably equivalent to between 15 and 20 per cent sodium carbonate. The calculations made in controlling the operation of the evaporator should be based on the composition of the diluted solution. For example, if the contents of the evaporator after heating are found to contain 6.0 per cent sodium bicarbonate and 20 per cent evaporation has occurred, the solution after dilution should contain 0.80×6.0=4.8 per cent sodium bicarbonate. After addition of water, the cooled solution is ready for circulation over the scrubber as has been described.

The handling of the gases and vapors from the evaporator is dependent upon the desired concentration of the hydrogen sulphide ultimately recovered. If it be desired to obtain a highly concentrated hydrogen sulphide, gases and vapors evolved during the heating under vacuum, are passed from the vacuum pump 16 through line 18 into the condenser 19 which is preferably of the reflux type shown. Here, most of the steam is condensed and runs into the tank 20 into which the vapor pipe is sealed to prevent the escape of the gases. The condensate may either be allowed to go to waste or may be transferred to the tank 3 and employed for diluting the rejuvenated liquor from the evaporator. The gases, hydrogen sulphide with some carbon dioxide, pass through the condenser and may be utilized as desired. The hydrogen sulphide, being mixed with only such carbon dioxide as may be expelled from the solution under vacuum, is in as concentrated a form as is possible to obtain by a heating process. After the heating under vacuum has been completed, valves 15 and 17 are closed, while valve 22 is opened and any additional gases and vapors that may be expelled by heating under pressure are conveyed through line 21. These gases consist almost entirely of carbon dioxide and steam and pass into a separate condenser 23 in which the steam is condensed. The condensate runs into the tank 24 and may be discharged as waste or employed in tank 3 to dilute the liquor from the evaporator.

In case it is unnecessary to make any separation of the hydrogen sulphide and carbon dioxide, valve 22 is kept closed and the condenser 23 is not used. After the completion of the heating under vacuum, valve 17 is opened and the gases and vapors during the remainder of the heating go through the evaporator 19.

The heating operations described above expel any hydrocyanic acid that may have been absorbed by the solution from the gas, and there is no tendency for the accumulation of hydrocyanic acid in the system.

Continuous evaporators may be employed in this process, and arrangements may be made to utilize the heat in the vapors for preheating the solution or for any other useful purpose.

Losses of the alkali in the solution either of a mechanical nature or caused by the formation of inert substances such as thiocyanates may be replenished by the addition of sodium carbonate or bicarbonate. When the latter is employed, it should be placed in tank 8. Sodium hydroxide may also be employed. When sodium hydroxide is supplied to the system, it quickly reacts with the carbon dioxide and hydrogen sulphide of the gas, forming sodium carbonate and sodium hydrosulphide, and the subsequent reactions are the same as when sodium carbonate is used. The equivalent potassium compounds may also be employed.

The invention, as hereinabove set forth may be variously embodied within the scope of the claims hereinafter made.

We claim:

1. The process of removing hydrogen sulphide and carbon dioxide from gases, which consists in: passing a gas containing such constituents into contact with a sodium carbonate solution to absorb the hydrogen sulphide and carbon dioxide from the gas; then subjecting the solution containing the absorbed impurities to heating under vacuum to expel the bulk of hydrogen sulphide from the solution, whereby the heating under vacuum is conducted in the presence of sodium bicarbonate which reacts with the sodium hydrosulphide of the solution; and thereafter subjecting the thus heated solution to a further heating operation under pressure to convert sodium bicarbonate to sodium carbonate and to restore the solution to a state available for further absorption of hydrogen sulphide and carbon dioxide from gases; substantially as specified.

2. The process of removing hydrogen sulphide and carbon dioxide from gases, which consists in: passing a gas containing such constituents into contact with an alkali-metal carbonate solution to absorb the hydrogen sulphide and carbon dioxide from the gas; then subjecting the solution containing the absorbed impurities to heating under vacuum to expel the bulk of hydrogen sulphide from the solution, whereby the heating under vacuum is conducted in the presence of alkali-metal bicarbonate which reacts with the alkali-metal hydrosulphide of the solution; and thereafter subjecting the thus heated solution to a further heating operation under pressure to convert alkali-metal bicarbonate to alkali-metal carbonate and to restore the solution to a state available for further absorption of hydrogen sulphide and carbon dioxide from gases; substantially as specified.

3. The process of removing hydrogen sulphide and carbon dioxide from gases, which consists in: passing a gas containing such constituents into contact with a solution of sodium carbonate-bicarbonate mixture to absorb the hydrogen sulphide and carbon dioxide from the gas; then subjecting the solution containing the absorbed impurities to heating under vacuum to expel the bulk of hydrogen sulphide from the solution, whereby the heating under vacuum is conducted in the presence of sodium bicarbonate which reacts with the sodium hydrosulphide of the solution; and thereafter subjecting the thus heated solution to a further heating operation under pressure to convert sodium bicarbonate to sodium carbonate and to restore the solution to a state available for further absorption of hydrogen sulphide and carbon dioxide from gases; substantially as specified.

4. The process of removing hydrogen sulphide and carbon dioxide from gases, which consists in: passing a gas containing such constituents into contact with a sodium carbonate solution to absorb the hydrogen sulphide and carbon dioxide from the gas; and then subjecting the solution containing the absorbed impurities to heating under vacuum to expel the bulk of hydrogen sulphide from the solution; substantially as specified.

5. The process of removing hydrogen sulphide and carbon dioxide from gases, which consists in: passing a gas containing such constituents into contact with an alkali-metal carbonate solution to absorb the hydrogen sulphide and carbon dioxide from the gas; and then subjecting the solution containing the absorbed impurities to heating under vacuum to expel the bulk of hydrogen sulphide from the solution; substantially as specified.

6. The process of removing hydrogen sulphide and carbon dioxide from gases, which consists in: passing a gas containing such constituents into contact with a sodium carbonate solution to absorb the hydrogen sulphide and carbon dioxide from the gas; subjecting the solution containing the absorbed impurities to heating to expel such impurities and to regenerate the solution for further absorption of hydrogen sulphide and carbon dioxide from gases; and regulating the pressure on the solution during the heating thereof to expel initially the bulk of hydrogen sulphide from the solution and thereafter the bulk of the absorbed carbon dioxide; substantially as specified.

7. The process of removing hydrogen sulphide and carbon dioxide from gases, which consists in: passing a gas containing such constituents into contact with an alkali-metal carbonate solution to absorb the hydrogen sulphide and carbon dioxide from the gas; subjecting the solution containing the absorbed impurities to heating to expel such impurities and to regenerate the solution for further absorption of hydrogen sulphide and carbon dioxide from gases; and regulating the pressure on the solution during the heating thereof to expel initially the bulk of hydrogen sulphide from the solution and thereafter the bulk of the absorbed carbon dioxide; substantially as specified.

8. The process of removing hydrogen sulphide and carbon dioxide from gases, which consists in: passing a gas containing such constituents into contact with a solution of alkali-metal carbonate-bicarbonate mixture to absorb the hydrogen sulphide and carbon dioxide from the gas; then subjecting the solution containing the absorbed impurities to heating under vacuum to expel the bulk of hydrogen sulphide from the solution, whereby the heating under vacuum is conducted in the presence of alkali-metal bicarbonate which reacts with the sodium hydrosulphide of the solution; and thereafter subjecting the thus heated solution to a further heating operation under pressure to convert alkali-metal bicarbonate to sodium carbonate and to restore the solution to a state available for further absorption of hydrogen sulphide and carbon dioxide from gases; substantially as specified.

9. The process of removing hydrogen sulphide and carbon dioxide from gases, which consists in: passing a gas containing such constituents into contact with a solution of alkali-metal carbonate-bicarbonate mixture to absorb the hydrogen sulphide and carbon dioxide from the gas; and then subjecting the solution containing the absorbed impurities to heating under vacuum to expel the bulk of hydrogen sulphide from the solution; substantially as specified.

10. The process of removing hydrogen sulphide and carbon dioxide from gases, which consists in: passing a gas containing such constituents into contact with a solution of sodium carbonate-bicarbonate mixture to absorb the hydrogen sulphide and carbon dioxide from the gas; subjecting the solution containing the absorbed impurities to heating to expel such impurities and to regenerate the solution for further absorption of hydrogen sulphide and carbon dioxide from gases; and regulating the pressure on the solution during the heating thereof to expel initially the bulk of hydrogen sulphide from the solution and thereafter the bulk of the absorbed carbon dioxide; substantially as specified.

11. The process of removing hydrogen sulphide and carbon dioxide from gases, which consists in: passing a gas containing such constituents into contact with a solution of alkali-metal carbonate-bicarbonate mixture to absorb the hydrogen sulphide and carbon dioxide from the gas; subjecting the solution containing the absorbed impurities to heating to expel such impurities and to regenerate the solution for further absorption of hydrogen sulphide and carbon dioxide from gases; and regulating the pressure on the solution during the heating thereof to expel initially the bulk of hydrogen sulphide from the solution and thereafter the bulk of the absorbed carbon dioxide; substantially as specified.

12. The herein specified treatment of solutions of alkali-metal carbonate-bicarbonate mixtures containing hydrogen sulphide, which consists in: subjecting such solutions to heating, and regulating the pressure on the solution during the heating thereof to expel initially the bulk of the hydrogen sulphide from the solution and thereafter to regulate the proportion of bicarbonate in the mixture.

In testimony whereof we have hereunto set our hands.

FREDERICK W. SPERR, Jr.
RALPH E. HALL.